(12) United States Patent
Hsu et al.

(10) Patent No.: US 11,057,606 B2
(45) Date of Patent: Jul. 6, 2021

(54) METHOD AND DISPLAY SYSTEM FOR INFORMATION DISPLAY BASED ON POSITIONS OF HUMAN GAZE AND OBJECT

(71) Applicants: Industrial Technology Research Institute, Hsinchu (TW); Intellectual Property Innovation Corporation, Hsinchu (TW)

(72) Inventors: Wei-Lin Hsu, Taichung (TW); Tzu-Yi Yu, Kaohsiung (TW); Heng-Yin Chen, Hsinchu County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 6 days.

(21) Appl. No.: 16/360,013

(22) Filed: Mar. 21, 2019

(65) Prior Publication Data

US 2020/0077072 A1 Mar. 5, 2020

(30) Foreign Application Priority Data

Aug. 28, 2018 (TW) ................................ 107129992

(51) Int. Cl.
*H04N 13/239* (2018.01)
*H04N 13/246* (2018.01)
(Continued)

(52) U.S. Cl.
CPC .......... *H04N 13/239* (2018.05); *G06N 20/20* (2019.01); *G06T 7/75* (2017.01); *G06T 7/85* (2017.01);
(Continued)

(58) Field of Classification Search
None
See application file for complete search history.

(56) References Cited

U.S. PATENT DOCUMENTS 9,639,154 B2 5/2017 Bostick et al.
9,841,814 B1* 12/2017 Kallmeyer .............. G06F 3/167
(Continued)

FOREIGN PATENT DOCUMENTS

CN 104345456 2/2015
CN 104685541 6/2015
(Continued)

OTHER PUBLICATIONS

Daniel Andersen et al.,"A Hand-Held, Self-Contained Simulated Transparent Display", IEEE International Symposium on Mixed and Augmented Reality (ISMAR-Adjunct), Feb. 2, 2017, pp. 1-6.
(Continued)

*Primary Examiner* — Michael J Cobb
(74) *Attorney, Agent, or Firm* — JCIPRNET

(57) ABSTRACT

A method and a system for information display are proposed. The system includes a light transmissive display, at least one first information extraction device, at least one second information extraction device, and a processing device, where the processing device is connected to the display, the first information extraction device, and the second information extraction device. The first information extraction device is configured to obtain position information of a user. The second information extraction device is configured to obtain position information of a target. The processing device is configured to perform coordinate transformation on the position information of the user and the position information of the object to generate fused information between the user and the target, and to display related information of the object on the display according to the fused information.

18 Claims, 12 Drawing Sheets

(51) Int. Cl.
*G06T 7/80* (2017.01)
*G06N 20/20* (2019.01)
*G06T 7/73* (2017.01)
*G06T 15/20* (2011.01)
*H04N 13/383* (2018.01)
*H04N 13/279* (2018.01)
*H04N 13/38* (2018.01)
*H04N 13/376* (2018.01)

(52) U.S. Cl.
CPC ......... *H04N 13/246* (2018.05); *H04N 13/383* (2018.05)

(56) References Cited

U.S. PATENT DOCUMENTS

| | | | |
|---|---|---|---|
| 2014/0098088 A1 | 4/2014 | Ryu | |
| 2014/0104316 A1 | 4/2014 | Sharma et al. | |
| 2015/0049112 A1* | 2/2015 | Liu | G06T 19/006 345/633 |
| 2015/0178318 A1* | 6/2015 | Lee | H04N 5/232945 348/231.3 |
| 2015/0243036 A1* | 8/2015 | Hoffmann | G06T 7/75 382/103 |
| 2016/0065903 A1* | 3/2016 | Wang | B60R 11/04 348/148 |
| 2016/0196693 A1* | 7/2016 | Kobayashi | G06F 3/014 345/633 |
| 2016/0261793 A1* | 9/2016 | Sivan | H04N 5/23219 |
| 2016/0291691 A1 | 10/2016 | Lee | |
| 2017/0089632 A1 | 3/2017 | Kang et al. | |
| 2017/0168159 A1 | 6/2017 | Gatland | |
| 2017/0285345 A1 | 10/2017 | Ferens et al. | |
| 2018/0089854 A1 | 3/2018 | Ahn et al. | |
| 2018/0108149 A1* | 4/2018 | Levinshtein | G06T 7/73 |
| 2018/0165857 A1* | 6/2018 | Lee | G06T 11/60 |
| 2019/0058860 A1* | 2/2019 | Wang | G06T 7/70 |

FOREIGN PATENT DOCUMENTS

| | | |
|---|---|---|
| CN | 105759422 | 7/2016 |
| CN | 105866949 | 8/2016 |
| CN | 106030614 | 10/2016 |
| CN | 106662930 | 5/2017 |
| CN | 107506032 | 12/2017 |
| CN | 107533230 | 1/2018 |
| CN | 108572450 | 9/2018 |
| TW | 201432495 | 8/2014 |
| TW | 201719120 | 6/2017 |
| TW | I595446 | 8/2017 |

OTHER PUBLICATIONS

"Office Action of China Counterpart Application", dated Apr. 6, 2021, p. 1-p. 15.

* cited by examiner

METHOD AND DISPLAY SYSTEM FOR INFORMATION DISPLAY BASED ON POSITIONS OF HUMAN GAZE AND OBJECT

CROSS-REFERENCE TO RELATED APPLICATION

This application claims the priority benefit of Taiwan application serial no. 107129992, filed on Aug. 28, 2018. The entirety of the above-mentioned patent application is hereby incorporated by reference herein.

TECHNICAL FIELD

The disclosure relates to a technique for information display.

BACKGROUND

With the development of image processing and spatial positioning technologies, the application of transparent displays has been getting more attention lately. Such technologies would allow a display to be paired with physical objects and related information to create an interactive experience based on user requests so that the information would be presented in a more intuitive fashion. However, an image capturing device configured to capture images in such display system would not be able to be disposed at the center of the display, and thus there would exist an offset between a captured object image and human vision. The related information of an object presenting on the display would hardly be fused with the physical objects at a certain level of precision and thereby cause the user's viewing discomfort.

SUMMARY OF THE DISCLOSURE

A method and a display system for information display are provided in the disclosure.

According to one of the exemplary embodiments, the display system includes a light-transmissive display, at least one first information extraction device, at least one second information extraction device, and a processing device, where the processing device is connected to the display, the first information extraction device, and the second information extraction device. The first information extraction device is configured to extract position information of a user. The second information extraction device is configured to extract position information of an object. The processing device is configured to perform coordinate transformation on the position information of the user and the position information of the object to generate fused information between the user and the object and display related information of the object on the display according to the fused information.

According to one of the exemplary embodiments, the display method is applicable to a display system having a light-transmissive display, at least one first information extraction device, at least one second information extraction device, and a processing device and includes the following steps. Position information of a user is extracted by using the first information extraction device, and position information of an object is extracted by using the second information extraction device. Coordinate transformation is performed on the position information of the user and the position information of the object to generate fused information between the user and the object, and the related information of the object is displayed on the display according to the fused information.

According to one of the exemplary embodiments, the display system includes a light-transmissive display and a processing device, where the processing device is connected to at least one first information extraction device and at least one second information extraction device. The processing device is configured to receive user position information of a user extracted by the first information extraction device and position information of an object extracted by the second information extraction device, perform coordinate transformation on the position information of the user and the position information of the object to generate fused information between the user and the object, and display related information of the object on the display according to the fused information.

In order to make the present disclosure comprehensible, embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
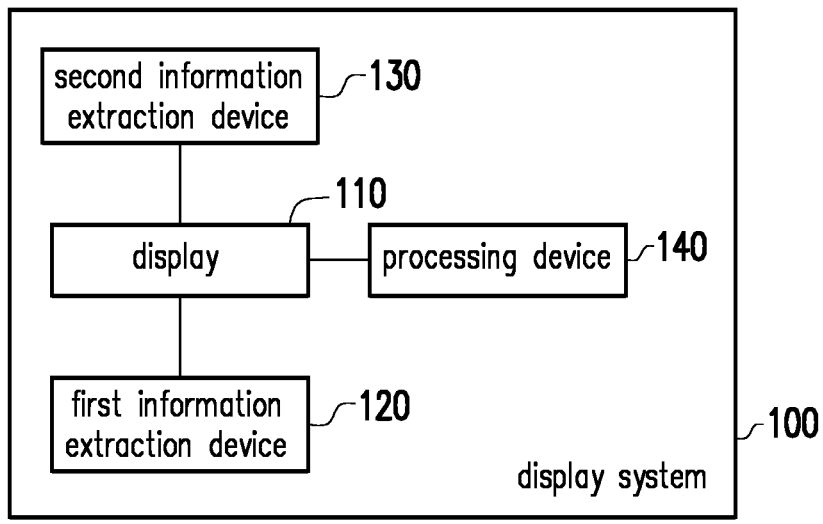
FIG. 1 illustrates a schematic diagram of a display system in accordance with one of the exemplary embodiments of the disclosure.

To make the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a display system in accordance with one of the exemplary embodiments of the disclosure. Components of the display system and their configurations are first introduced in FIG. 1. The functionalities of the components are disclosed in more detail in conjunction with subsequent exemplary embodiments.

Referring to FIG. 1, a display system 100 in the present exemplary embodiment would include a display 110, at least one first information extraction device 120 (described in plural hereafter), at least one second information extraction device 130 (described in plural hereafter), and a processing device 140, where the processing device 140 may be wired, wirelessly, or electrically connected to the display 110, the first information extraction device 120, and the second information extraction device 130.

The display 110 would be configured to display information and may be a projection light-transmissive display or a penetration light-transmissive display such as a liquid crystal display (LCD), a field sequential color (FSC) display, a light emitting diode (LED) display, or an electrowetting display. The content viewed by the user through the display 110 would be an actual scene combined with related information of an object.

The first information extraction devices 120 would be configured to extract position information of the user, and the second information extraction devices 130 would be configured to extract position information of the object in the actual scene. The first information extraction device 120 may be, for example, at least one image sensor, at least one depth sensor, or a combination thereof. That is, for any or a combination of devices able to locate the position information of the user would be considered as the first information extraction device 120. The second information extraction devices 130 may be, for example, multiple image sensors or at least one image sensor along with at least one depth sensor. That is, for any or a combination of devices able to locate the position information of the object and identify the image information of the object would be considered as the second information extraction device 130. As known per se, each aforesaid image sensor would be configured to capture images and would include a camera lens having an optical lens and sensing elements. Each aforesaid depth sensor would be configured to detect depth information and may be implemented as an active depth sensor or a passive depth sensor. The active depth sensing approach may calculate the depth information in front of the screen by actively emitting signals including light source, inferred, ultrasonic, laser as a signal with time-of-flight (ToF) technology. The passive depth sensing approach may capture two images from different viewing angles by using two image sensors at the same time so as to calculate for the depth information by using disparities between the two images.

The processing device 140 would be configured to control the operation of the display system 100 and would include a memory and a processor. The memory may be, for example, any type of fixed or removable random-access memory (RAM), read-only memory (ROM), flash memory, hard disc or other similar devices, integrated circuits, or any combinations thereof. The processor may be, for example, a central processing unit (CPU), an application processor (AP), or other programmable general purpose or special purpose microprocessor, digital signal processor (DSP), image signal processor (ISP), graphics processing unit (GPU) or other similar devices, integrated circuits, or any combinations thereof.

In the present exemplary embodiment, the processing device 140 may be built-in in the display 110. The first information extraction devices 120 and the second information extraction devices 130 would be respectively disposed on two sides of the display 110 or respectively disposed on the top of the field and at both sides with respect to the display 110 to perform positioning on the user and the object and transmit information to the processing device 140 through their communication interfaces in any existing wired or wireless transmission standard. In another exemplary embodiment, the display system 100 may be integrated into an all-in-one system and may be implemented as an integrated head-mounted display. The disclosure is not limited in this regard. Details of the information display implementation will be described in conjunction with the various elements of the display system 100 in the following embodiments.

Figure 2:
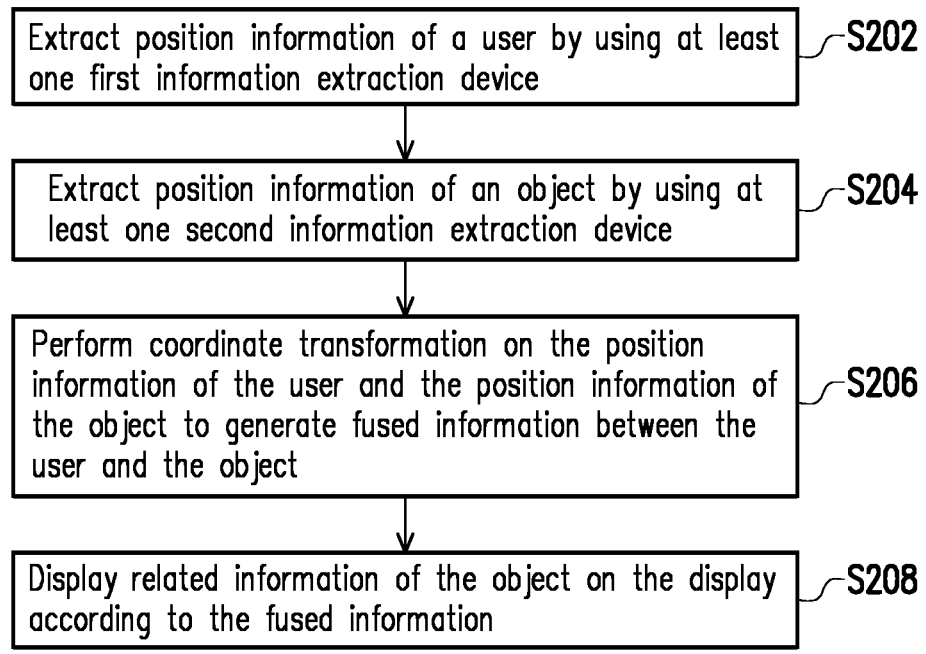
FIG. 2 illustrates a flowchart of a method for information display in accordance with one of the exemplary embodiments of the disclosure.

FIG. 2 illustrates a flowchart of a method for information display in accordance with one of the exemplary embodiments of the disclosure. The steps of FIG. 2 could be implemented by the display system 100 as illustrated in FIG. 1. Herein, the user may view an object and its related information through the display 110 of the display system 100.

Referring to FIG. 1 and FIG. 2, the processing device 140 of the display system 100 would extract position information of a user by using the first information extraction devices 120 (Step S202) and extract position information of an object by using the second information extraction devices 130 (Step S204). The first information extraction devices 120 and the second information extraction devices 130 may be, for example, an image sensor, a depth sensor, or a combination thereof for locating the user and the object. The detailed implementation would be illustrated in the following exemplary embodiments.

Next, the processing device 140 would perform coordinate transformation on the position information of the user and the position information of the object to generate fused information between the user and the object (Step S206). Herein, the position information of the user and the object may be represented by coordinates with respect to the first information extraction devices 120 and the second information extraction devices 130. The processing device 140 may calibrate and transform the position information extracted by the first information extraction devices 120 and the second information extraction devices 130 to a same coordinate system. The position information of the user may include a user coordinate of the user with respect to the first information extraction devices 120, and the position information of the object may include an object coordinate of the object with respect to the second information extraction devices 130. The processing device 140 may transform the user coordinate and the object coordinate to the same coordinate system such as a world coordinate system to further obtain positions of the user and the object in a 3D space. Next, the processing device 140 may estimate human eye gaze information of the user and stereo calibration information of a scene (referred to as "stereo scene calibration information" hereafter) where the object is located according to a coordinate transformation result of the user and the object and consider the aforesaid estimated information as a basis to generate the fused information between the user and the object with respect to the display 110. For example, the processing device 140 may calculate a gaze point of the user on the display 110 (e.g. a viewing range of the user) and perform image recognition on the object on the object image to generate an image recognition result. Next, the processing device 140 may generate the fused information according to the gaze point, the image recognition result, and the stereo scene calibration information.

In detail, a horizontal angle and a vertical angle of a visible range of human eyes are respectively approximate to 124° and 120°, and an overall viewing angle of two eyes is approximate to 170°. Photoreceptor cells in human eyes are not evenly distributed and are distributed more densely in the middle concave portion than other portions. Therefore, facing front at, for example, 0° to 30° as center angles for recognition may precisely identify the presence of an object, and more than 30° angles would be out of the corner of human eyes. Accordingly, assume that the distance between human eyes and the display 110 is M, and the center angle for recognition is 15°. Then, the gaze range A may be obtained as follows: d=M×tan 15 and A=π×d².

Next, the processing device 140 would display related information of the object on the display 110 according to the fused information (Step S208). Herein, the processing device 140 may set a displaying position of the related information of the object according to the human eye gaze information of the user and the stereo scene calibration information of the object indicated in the fused information. Moreover, the processing device 140 may further set the related information along with image information of the object. The related information may be guiding information of the object, virtual interaction object of the object, and so forth. The disclosure is not limited in this regard. The processing device 140 would allow the related information displayed on the display 110 to decently match the user's gaze according to the integrated fused information to enhance the user's viewing experience with comfort.

For better comprehension, the flows of FIG. 2 would be described in further details with different configurations of the display system 100 in the following exemplary embodiments.

Figure 3A:
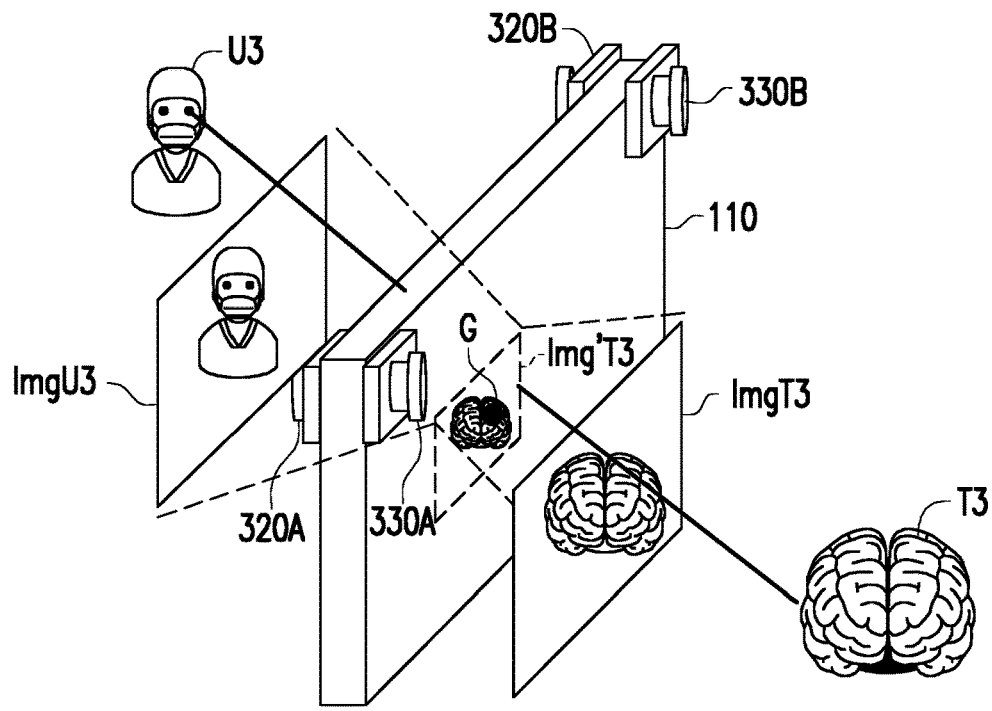
FIG. 3A illustrates a schematic diagram of a configuration of the display system in accordance with an exemplary embodiment of the disclosure.
Figure 3B:
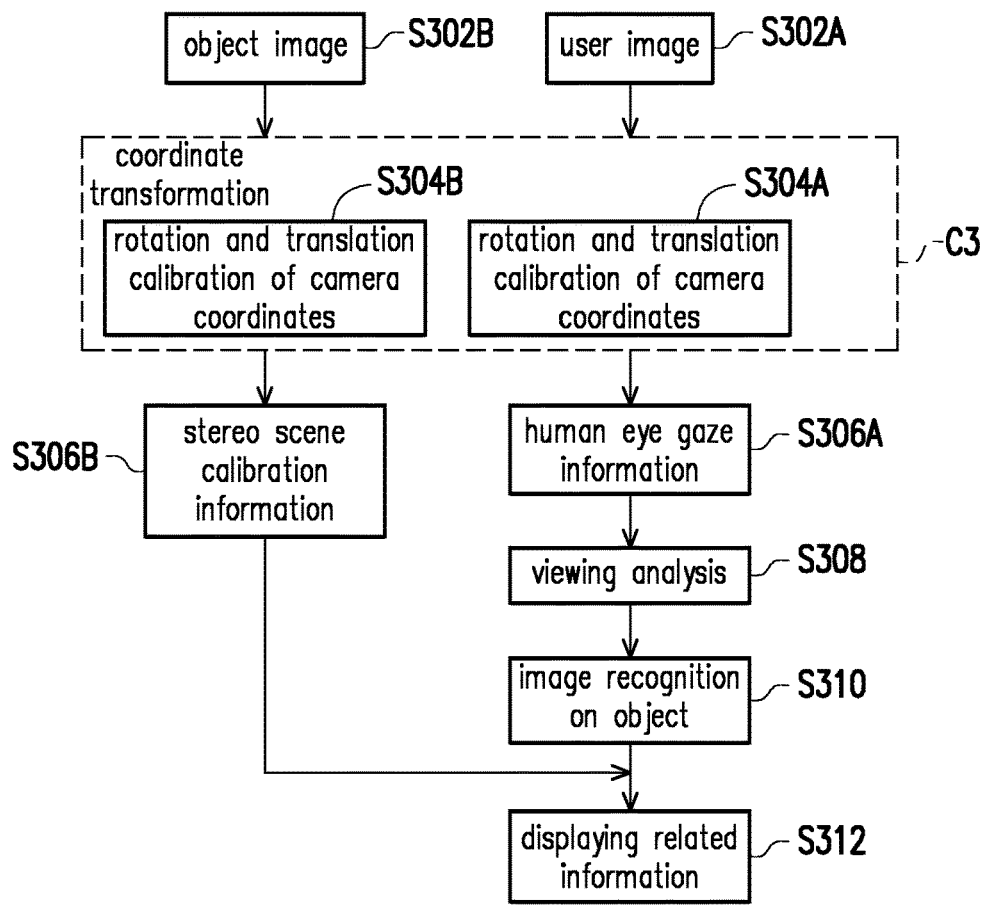
FIG. 3B illustrates a flowchart of a method for information display in accordance with an exemplary embodiment of the disclosure.

FIG. 3A illustrates a schematic diagram of a configuration of the display system in accordance with an exemplary embodiment of the disclosure. FIG. 3B illustrates a flowchart of a method for information display in accordance with an exemplary embodiment of the disclosure.

Referring to FIG. 3A, in the present exemplary embodiment, the first information extraction devices 120 may determine gaze information of the user and may be implemented as two image sensors 320A and 320B to perform image capturing on the user U3 to generate two user images ImgU3 of different viewing angles. The second information extraction device 130 may determine scene information viewed by the user through the display 110 and may be implemented as two image sensors 330A and 330B to perform image capturing on the scene of the object T3 to generate two object images ImgT3 of different viewing angles. The processing device 140 would execute the steps in FIG. 3B by using the user images ImgU3 and the object images ImgT3.

Referring to both FIG. 3A and FIG. 3B, the processing device 140 would perform coordinate transformation (C3) after obtaining the user images ImgU3 (Step S302A) and the object images ImgT3 (Step S302B) in the present exemplary embodiment. Herein, the processing device 140 would perform rotation and translation on the user images ImgU3 with respect to camera coordinates of the image sensor 320A and 320B (Step S304A). In detail, the processing device 140 would calculate, align, and merge an offset between the image sensors 320A and 320B in an actual space to the world coordinate system. The processing device 140 may perform coordinate transformation according to Eq(1):

$$s \begin{bmatrix} u \\ v \\ 2 \end{bmatrix} = \begin{bmatrix} a_x & 0 & u_0 & 0 \\ 0 & a_y & v_0 & 0 \\ 0 & 0 & 1 & 0 \end{bmatrix} \begin{bmatrix} R & t \\ 0^T & 1 \end{bmatrix} \begin{bmatrix} X \\ Y \\ Z \\ 1 \end{bmatrix} \quad (1)$$

where $$\begin{bmatrix} R & t \\ 0^T & 1 \end{bmatrix} = \begin{bmatrix} R_{11} & R_{12} & R_{13} & T_1 + \Delta x \\ R_{21} & R_{22} & R_{23} & T_2 + \Delta y \\ R_{31} & R_{32} & R_{33} & T_3 + \Delta z \\ 0 & 0 & 0 & 1 \end{bmatrix}, s \begin{bmatrix} u \\ v \\ 2 \end{bmatrix}$$

is an image coordinate, $$\begin{bmatrix} a_x & 0 & u_0 & 0 \\ 0 & a_y & v_0 & 0 \\ 0 & 0 & 1 & 0 \end{bmatrix}$$

is a matrix of internal camera parameters, $$\begin{bmatrix} R & t \\ 0^T & 1 \end{bmatrix}$$

is a matrix of external camera parameters, $$\begin{bmatrix} X \\ Y \\ Z \\ 1 \end{bmatrix}$$

is a world coordinate, (Δx, Δy, Δz) is the offset of the image sensors 320A and 320B in the actual space. The processing device 140 would perform rotation and translation on the object images ImgT3 with respect to camera coordinates of the image sensor 320A and 320B (Step S304B). Similarly, the processing device 140 would calculate, align, and merge an offset between the image sensors 320A and 320B in the actual space to the world coordinate system.

After the processing device 140 integrates stereo space corresponding to the user images ImgU3 and stereo space corresponding to the object images ImgT3 to the same coordinate system to respectively obtain user world coordinates and object world coordinates, the processing device 140 would obtain human eye gaze information (Step S306A) and stereo scene calibration information (Step S306B). Herein, the processing device 140 may estimate the human eye gaze information by leveraging any eye tracking algorithm and thereby obtain viewing analysis of the user U3 with respect to the display 110 (Step 308) so as to obtain a gaze point G of the user on the display 110. It would be reasonable to assume that the object T3 is along the user's gaze direction (i.e. an extended line of the user U3 and the gaze point G). The processing device 140 would perform image recognition on the object T3 by using the object image ImgT3 according to the user's gaze (Step S310) so as to obtain a scene content viewed by the user U3. Along with the stereo scene calibration information, the processing device 140 would compute a presentation of the related information of the object T3 on the display 110 to accordingly display the related information (Step S312). The related information in the present exemplary embodiment may be plane information, and the processing device 140 may set a displaying position of the related information on the display 110 as the fused information of the user U3 and the object T3 according to the gaze point G, the image recognition result of the object T3, and the stereo scene calibration information and display the related information on the displaying position. As such, the user U3 may be able to view an actual scene with the related information of the object through the display 110.

As a side note, in an exemplary embodiment, the first information extraction devices 120 may be a locator and a receiver to speed up to obtain the human eye gaze information of the user U3, where the locator may be a handheld device or a wearable device of the user U3, and the receiver may be disposed on the display 110. The receiver may receive the user world coordinate in the world coordinate system of the user U3 from the locator through any existing active or inactive transmission standard, and the processing device 140 would be able to locate the user's position and thereby estimate the position of the human eyes. In an exemplary embodiment, the display 110 of the display system 100 may be a touch display. That is, the first information extraction devices 120 may be touch sensing elements configured on the display 110 to detect touch operations of the user U3 on the display 110. The touch position of the user on the display 110 would be assumed as the gaze point of the user on the display 110. Moreover, in an exemplary embodiment, an additional IR image sensor configured to capture the user's IR image and/or an IR image sensor configured to capture the object's IR image may be disposed on the hardware architecture as illustrated on the FIG. 3A to compute more precise position information between the user and the object. It should be noted that, no matter which type of the sensor is used to obtain the position information of the user or the object, the processing device 140 would integrate the corresponding position information into a same coordinate system.

Figure 4A:
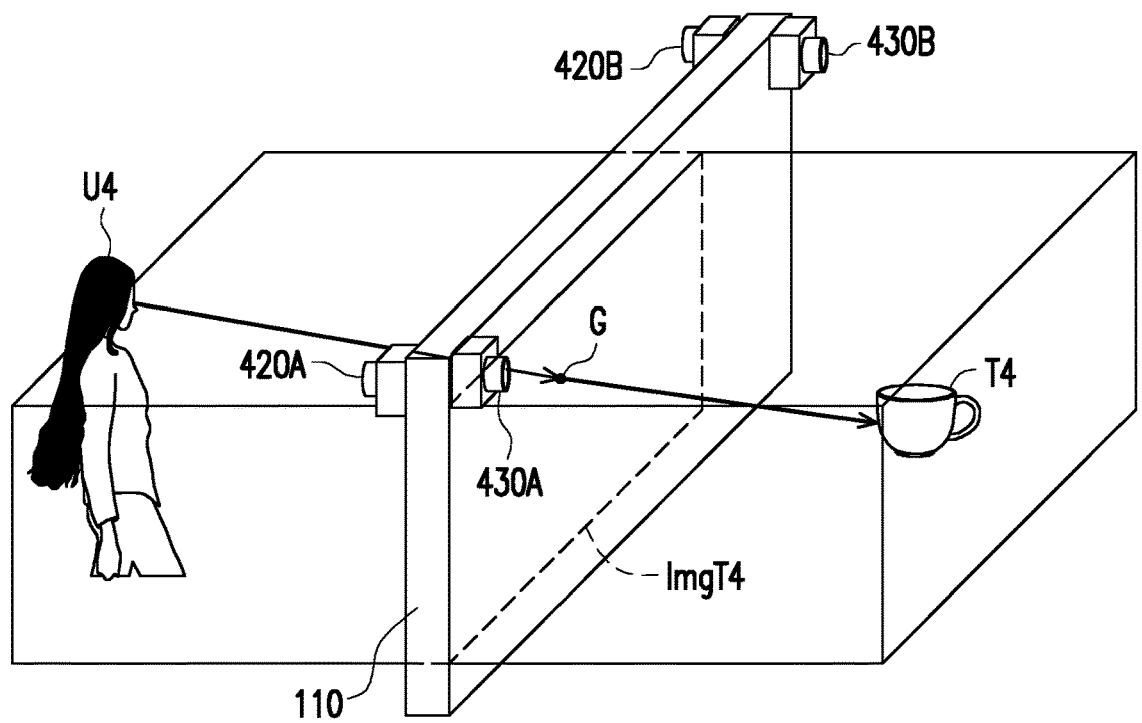
FIG. 4A illustrates a schematic diagram of a configuration of the display system in accordance with an exemplary embodiment of the disclosure.
Figure 4B:
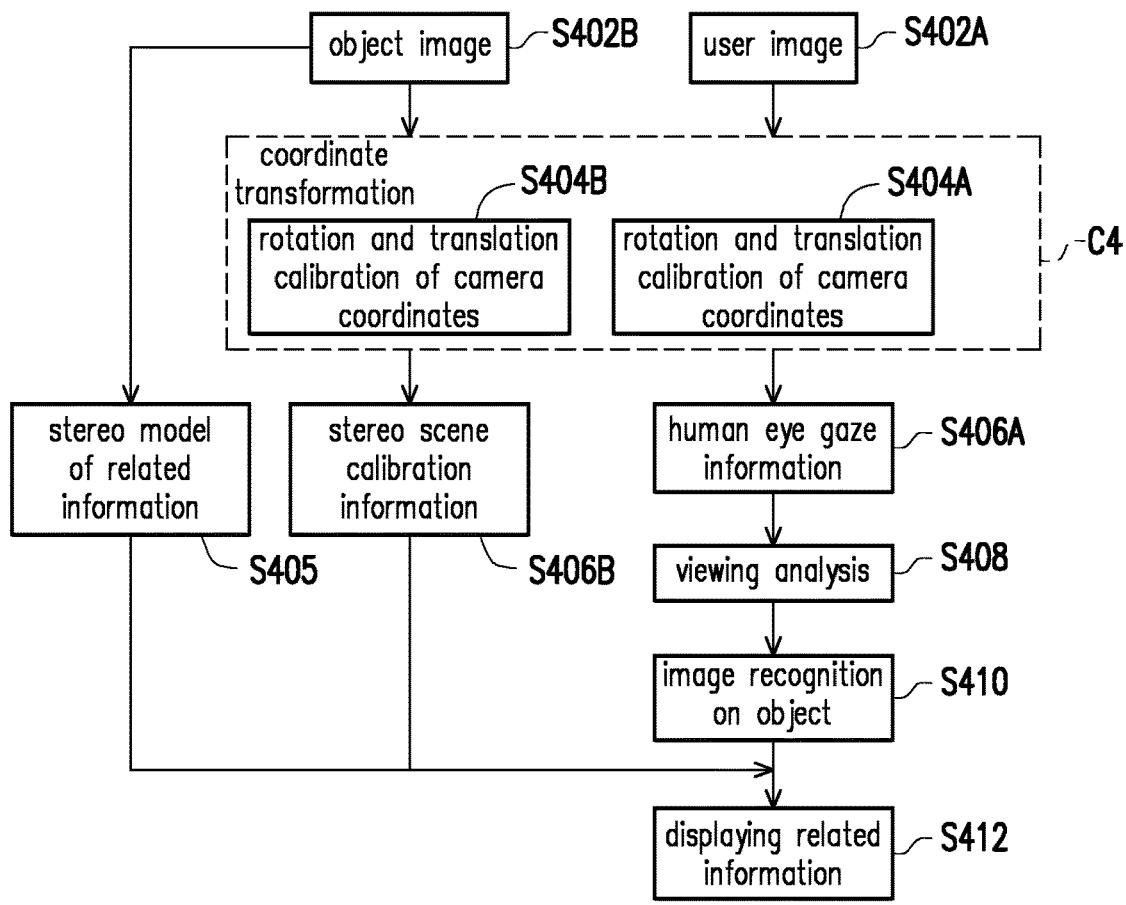
FIG. 4B illustrates a flowchart of a method for information display in accordance with an exemplary embodiment of the disclosure.

FIG. 4A illustrates a schematic diagram of a configuration of the display system in accordance with an exemplary embodiment of the disclosure. FIG. 4B illustrates a flowchart of a method for information display in accordance with an exemplary embodiment of the disclosure. Related information of an object in FIG. 4A and FIG. 4B would be stereo information.

Referring to FIG. 4A, in the present exemplary embodiment, the first information extraction devices 120 may determine gaze information of the user and may be implemented as two image sensors 420A and 420B to perform image capturing on the user U4 to generate two user images. The second information extraction device 130 may determine scene information viewed by the user U4 through the display 110 and may be implemented as two image sensors 430A and 430B to perform image capturing on the scene of an object T4 to generate two object images ImgT4. The processing device 140 would execute the steps in FIG. 4B by using the user images and the object images ImgT4.

Referring to both FIG. 4A and FIG. 4B, the processing device 140 would perform coordinate transformation (C4) after obtaining the user images (Step S402A) and the object images (Step S402B) in the present exemplary embodiment. In detail, the processing device 140 would perform rotation and translation on the user images with respect to camera coordinates of the image sensor 420A and 420B (Step S404A) and perform rotation and translation on the object images with respect to camera coordinates of the image sensor 430A and 430B (Step S404B). After the processing device 140 integrates stereo space corresponding to the user images and stereo space corresponding to the object images to the same coordinate system, the processing device 140 would obtain human eye gaze information (Step S406A) and stereo scene calibration information (Step S406B). Next, the processing device 140 would perform viewing analysis on the user U4 with respect to the display 110 (Step S408) so as to obtain a gaze point G of the user U4 on the display 110. The processing device 140 would perform image recognition on the object T4 by using the object image according to the user's gaze (Step S410) so as to obtain a scene content viewed by the user U4. The details on Steps S402A-S410 would be similar to those in FIG. 3B and would not be repeated herein for brevity.

Differentiated from the exemplary embodiment in FIG. 3B, herein the processing device 140 would pre-construct a stereo model of related information (Step S405) and compute a presentation of the related information of the object T4 on the display 110 along with the stereo scene calibration information to accordingly display the related information (Step S412). In other words, the related information in the present exemplary embodiment is stereo information, and the processing device 140 may set the fused information between the user U4 and the object T4 according to the gaze point G, the image recognition result of the object T4, a displaying position of the display 110 set in the stereo scene calibration information and consider the fused information as a basis for display the related information. As such, the user U4 may be able to view an actual scene with the stereo related information through the display 110.

Figure 5A:
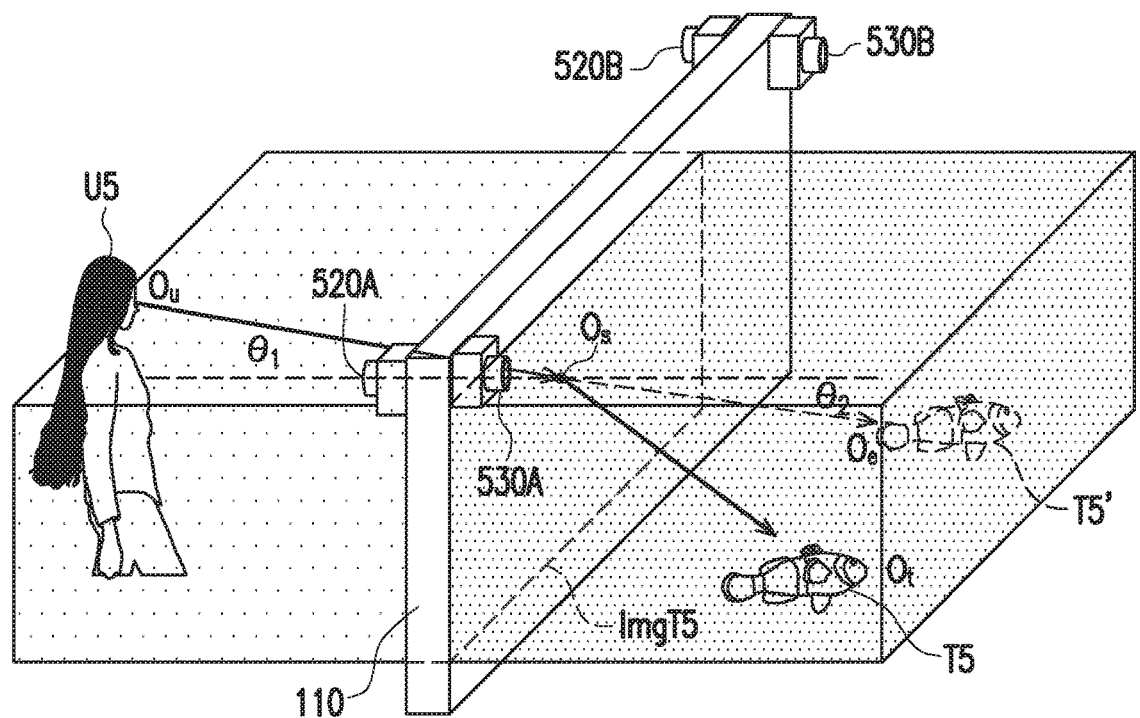
FIG. 5A illustrates a schematic diagram of a configuration of the display system in accordance with an exemplary embodiment of the disclosure.
Figure 5B:
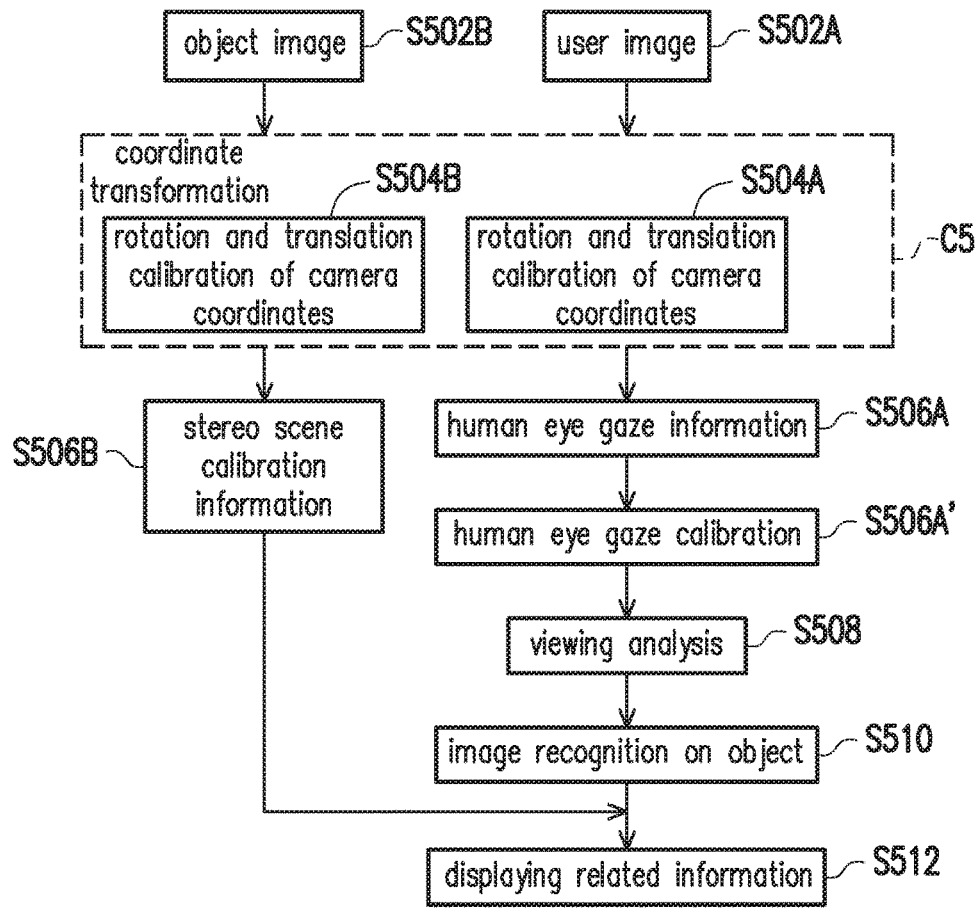
FIG. 5B illustrates a flowchart of a method for information display in accordance with an exemplary embodiment of the disclosure.

FIG. 5A illustrates a schematic diagram of a configuration of the display system in accordance with an exemplary embodiment of the disclosure. FIG. 5B illustrates a flowchart of a method for information display in accordance with an exemplary embodiment of the disclosure. A user and an object in the exemplary embodiment of FIG. 5A and FIG. 5B are in different mediums, and therefore human eye gaze information would be further calibrated according to refractive indices of the different mediums.

Referring to FIG. 5A, in the present exemplary embodiment, the first information extraction devices 120 may determine gaze information of the user and may be implemented as two image sensors 520A and 520B to perform image capturing on the user U5 to generate two user images. The second information extraction device 130 may determine scene information viewed by the user through the display 110 and may be implemented as two image sensors 530A and 530B to perform image capturing on the scene of an object T5 to generate two object images ImgT5. The processing device 140 would execute the steps in FIG. 5B by using the user images and the object images ImgT5. In the present exemplary embodiment, the user U5 and the object T5 are respectively in a medium 1 having a refractive index $n_1$ and a medium 2 having a refractive index $n_2$ such as air and water, and $\theta_1$ and $\theta_2$ are an incident angle and a refracted angle of human eye gaze with respect to a normal line. The processing device 140 would perform calibration on the human eye gaze for viewing analysis to obtain an actual position of the object T5.

Referring to both FIG. 5A and FIG. 5B, the processing device 140 would perform coordinate transformation (C5) after obtaining the user images (Step S502A) and the object images (Step S502B) in the present exemplary embodiment. In detail, the processing device 140 would perform rotation and translation on the user images with respect to camera coordinates of the image sensor 520A and 520B (Step S504A) and perform rotation and translation on the object images with respect to camera coordinates of the image sensor 530A and 530B (Step S504B). After the processing device 140 integrates stereo space corresponding to the user images and stereo space corresponding to the object images to the same coordinate system, the processing device 140 would obtain human eye gaze information (Step S506A) and stereo scene calibration information (Step S506B). The details on Steps S502A-S506 would be similar to those in FIG. 3B and would not be repeated herein for brevity.

In the present exemplary embodiment, the processing device 140 would further perform calibration on the human eye gaze information (Step S506A') to obtain calibrated human eye gaze information. In detail, when the processing device 140 obtains the human eye gaze information according to Eq.(1), since the user U5 is viewing the object T5 in a different medium, the processing device 140 would perform calibration on the obtained human eye gaze information according to Snell's Law and Eq.(2) based on the refractive indices of the two mediums:

$$\overrightarrow{O_sO_t} = -|\cos\beta| \times \overrightarrow{O_sO_e} + \left|\frac{\cos\beta}{\sin\theta}\right| \times \left(\overrightarrow{O_uO_s} + |\cos\theta| \times \overrightarrow{O_sO_e}\right) \quad (2)$$

Herein, $\overrightarrow{O_sO_t}$ denotes the calibrated human eye gaze information; $\overrightarrow{O_uO_s}$ and $\overrightarrow{O_sO_e}$ denote the human eye gaze information of the user; $\theta$ denotes the incident angle; $\beta$ denotes the refractive angle. Light refraction may be simplified by using the vectors and the refractive indices of the mediums of both sides by using Eq.(2) and the Snell's Law $n_1 \sin\theta_1 = n_2 \sin\theta_2$.

After obtaining the calibrated human eye gaze information, the processing device 140 would perform viewing analysis on the user U5 with respect to the display 110 (Step S508) so as to obtain a gaze point $O_s$ of the user on the display 110. The processing device 140 would perform image recognition on an object T5' by using the object images ImgT5 according to the user's gaze (Step S510) so as to obtain a scene content viewed by the user U5. Next, the processing device 140 would compute a presentation of the related information of the object T5 on the display 110 along with the stereo scene calibration information to accordingly display the related information (Step S512). The details on Steps S508-S512 would be similar to those in FIG. 3B and would not be repeated herein for brevity.

Figure 6A:
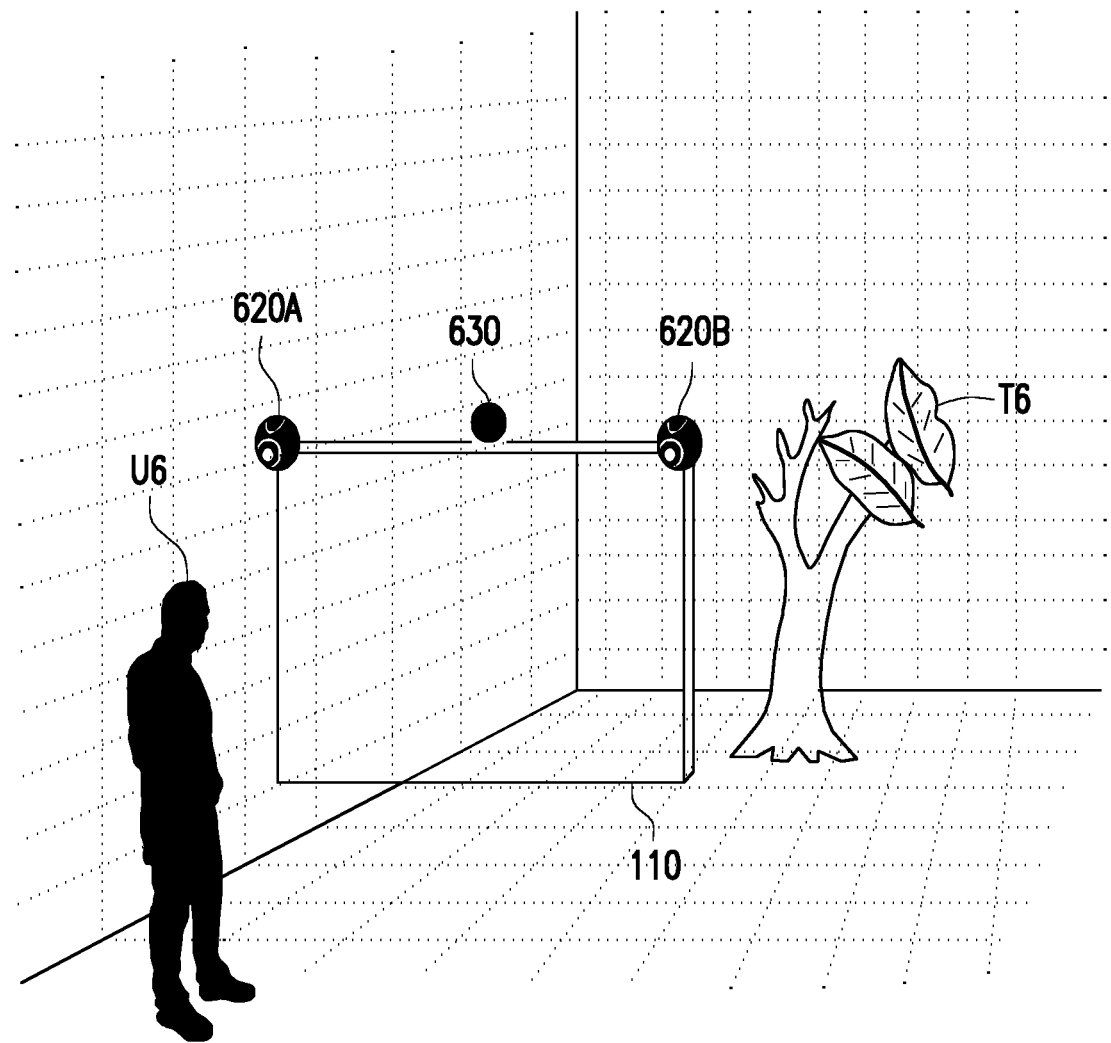
FIG. 6A illustrates a schematic diagram of a configuration of the display system in accordance with an exemplary embodiment of the disclosure.
Figure 6B:
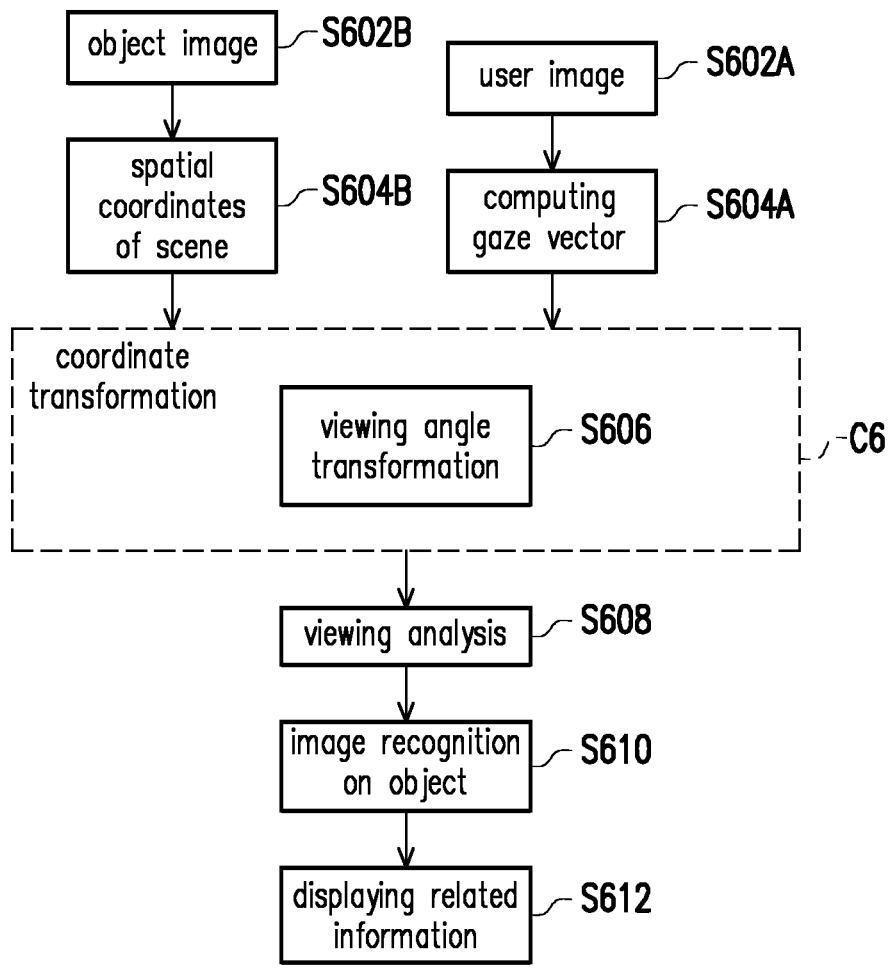
FIG. 6B illustrates a flowchart of a method for information display in accordance with an exemplary embodiment of the disclosure.

FIG. 6A illustrates a schematic diagram of a configuration of the display system in accordance with an exemplary embodiment of the disclosure. FIG. 6B illustrates a flowchart of a method for information display in accordance with an exemplary embodiment of the disclosure. In the present exemplary embodiment, a stereo scene model of an object would be pre-constructed and stored in the processing device 140 to speed up the overall information display process.

Referring to FIG. 6A, in the present exemplary embodiment, the first information extraction devices 120 may determine gaze information of the user and may be implemented as two image sensors 620A and 620B to perform image capturing on the user U6 to generate two user images. The second information extraction device 130 may determine scene information viewed by the user through the display 110 and may be implemented as an image sensor 630 to perform image capturing on the scene of an object T6 to generate one object image. In the present exemplary embodiment, since the stereo scene model of the object T6 is pre-constructed, one object would be required for analyzing the scene information viewed by the user through the display 110. The processing device 140 would execute the steps in FIG. 5B by using the user images and the object images.

Referring to both FIG. 6A and FIG. 6B, the processing device 140 obtain the user images (Step S602A) and calculate a gaze vector according to the user images (Step S604A). Also, the processing device 140 would obtain the object image (Step S602B), obtain pre-stored scene spatial coordinates (i.e. a stereo model, Step S604B), and perform coordinate transformation (C6). In detail, the processing device 140 may perform viewing angle transformation (Step S606) according to Eq.(3)

$$\begin{cases} X' = a_1 X + b_1 - d_1 \Delta Z - c_1 \Delta X \\ Y' = a_2 Y + b_2 - d_2 \Delta Z - c_2 \Delta Y \end{cases} \quad (3)$$

Herein, (X, Y, Z) denotes a gaze vector; ($\Delta X$, $\Delta Y$, $\Delta Z$) denotes an offset of a human eye position in a user image with respect to an image center; (X', Y', Z') denotes a calibrated gaze vector; and $a_1$, $b_1$, $c_1$, $d_1$, $a_2$, $b_2$, $c_2$, and $d_2$ are constants associated with the positions of the image sensors 620A, 620B, and the object T6, and these constants are pre-stored in the processing device 140 and able to be estimated based on training gaze vectors, offsets, and calibrated gaze vectors.

After obtaining the calibrated human eye gaze information, similar to the previous exemplary embodiments, the processing device 140 would perform viewing analysis on the user U6 with respect to the display 110 (Step S608) and perform image recognition on the object T6 by using the object image (Step S610) so as to obtain a scene content viewed by the user U6. Next, the processing device 140 would compute a presentation of the related information of the object T6 on the display 110 to accordingly display the related information (Step S612). The details on Steps S608-S612 would be similar to those in FIG. 3B and would not be repeated herein for brevity.

Figure 7A:
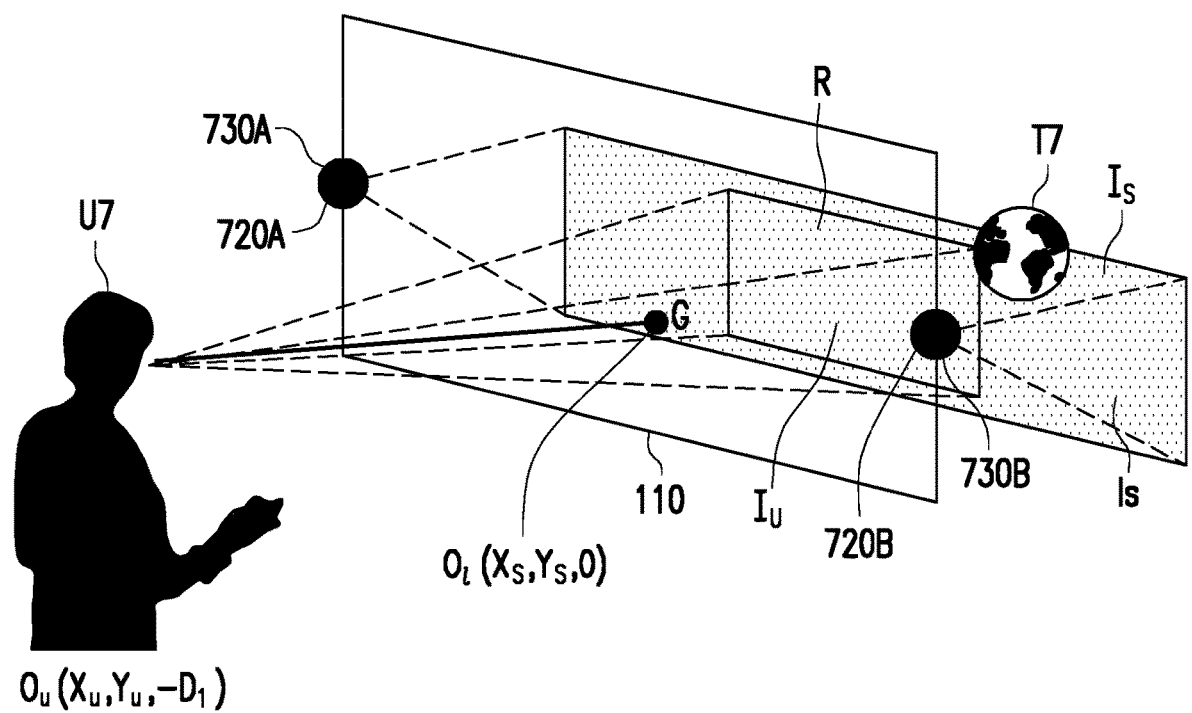
FIG. 7A illustrates a schematic diagram of a configuration of the display system in accordance with an exemplary embodiment of the disclosure.
Figure 7B:
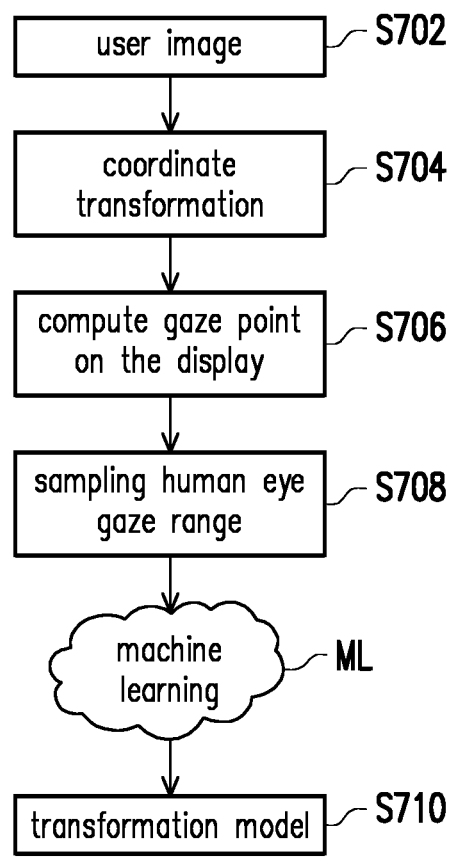
FIG. 7B illustrates a flowchart of a method for constructing a vision transformation model in accordance with an exemplary embodiment of the disclosure.

FIG. 7A illustrates a schematic diagram of a configuration of the display system in accordance with an exemplary embodiment of the disclosure. FIG. 7B illustrates a flowchart of a method for constructing a vision transformation model in accordance with an exemplary embodiment of the disclosure, where the vision transformation model would be able to be pre-constructed by a machine learning approach to integrate different viewing behaviors as well as speed up the overall information display flow.

Referring to FIG. 7A, in the present exemplary embodiment, the first information extraction devices 120 may determine gaze information of the user and may be implemented as two image sensors 720A and 720B to perform image capturing on the user U7 to generate two user images. The second information extraction device 130 may determine scene information viewed by the user through the display 110 and may be implemented as two image sensors 730A and 730B to perform image capturing on the scene of an object T7 to generate two object images.

It should be noted that, the present exemplary embodiment is related to a model training stage. The processing device 140 may generate a global image including all possible positions of the user and the object according to the user images and the object images, where the global image is represented by $I_S$. Next, assume that the human eye position of the user is represented by $O_u(X_u, Y_u, -D_1)$, the human eye gaze position is represented by $O_I(X_S, Y_S, 0)$, the gaze vector is represented by $\overrightarrow{O_u O_I}$. The processing device 140 may then pre-construct a relationship $I_U = H(I_U \cap I_S)$ between the global image $I_S$ and the user's field of view $I_U$, train the vision transformation model through machine learning by inputting the human eye positions $O_u$ and the gaze vectors $\overrightarrow{O_u O_I}$, and store the vision transformation model.

Referring to FIG. 7A and FIG. 7B, in such model training stage, the processing device 140 would obtain the user images (Step S702) to calculate a human eye position (Step S704) and calculate a gaze point G on the display 110 (Step S706). Next, the processing device 140 would label a human eye viewing range R (Step S708) and perform machine learning ML by using, for example, a deep neural network (DNN) model, a support vector machine (SVM) model to generate a transformation model (Step S710). As known per se, since a massive amount of training data is required during machine learning to generate a precise model, the processing device 140 would repeat Steps S702-S708, that is, collect different training human eye positions and the corresponding training gaze points and train human eye viewing ranges for machine learning ML. After the transformation model is constructed, in the model usage stage, once the processing device 140 obtains and inputs the human eye position of the user to the transformation model, the user's field of view would be rapidly obtained.

Figure 8A:
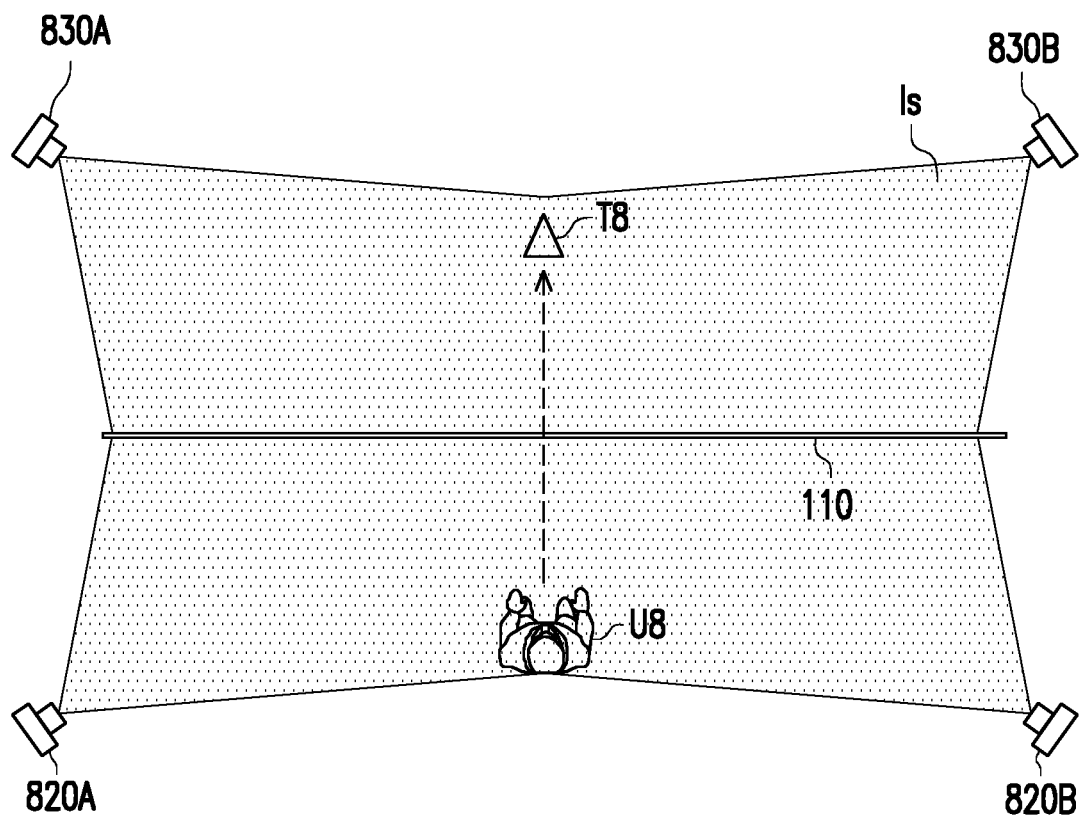
FIG. 8A illustrates a schematic diagram of a configuration of the display system in accordance with an exemplary embodiment of the disclosure.
Figure 8B:
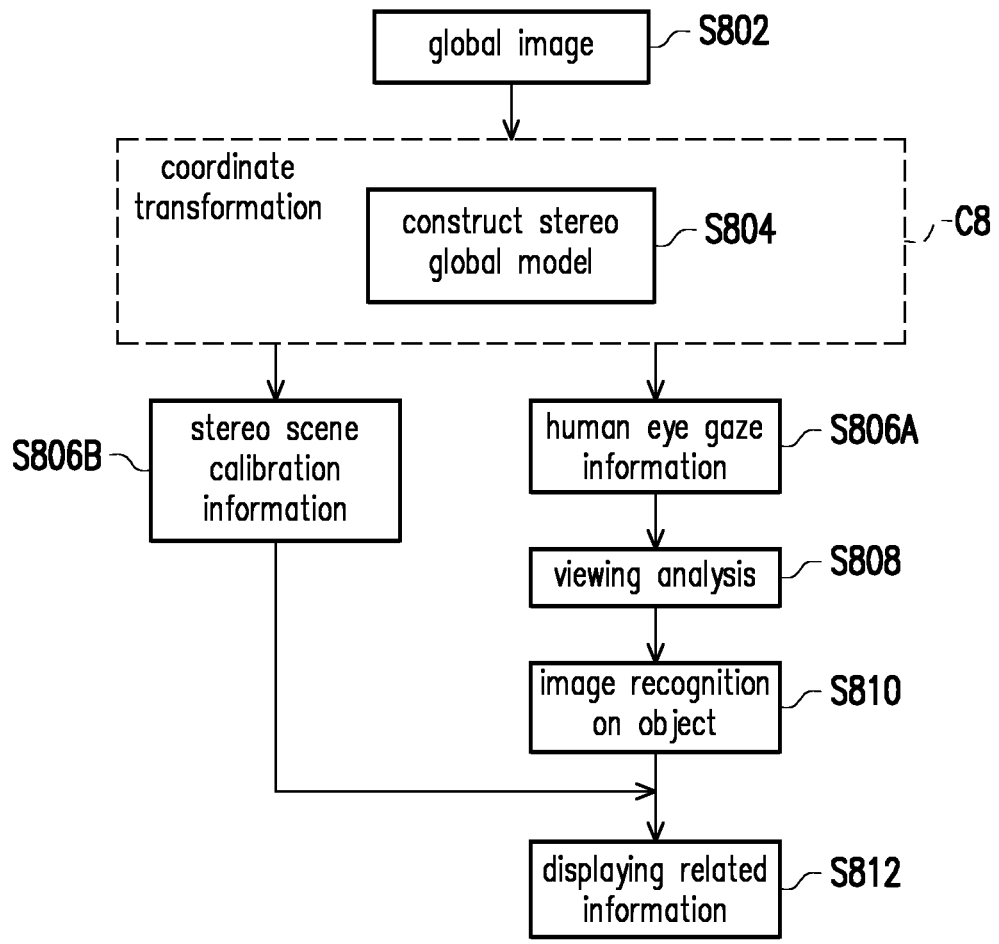
FIG. 8B illustrates a flowchart of a method for information display in accordance with an exemplary embodiment of the disclosure.

FIG. 8A illustrates a schematic diagram of a configuration of the display system in accordance with an exemplary embodiment of the disclosure. FIG. 8B illustrates a flowchart of a method for information display in accordance with an exemplary embodiment of the disclosure. In the present exemplary embodiment, stereo information of an entire scene would be constructed by a global image including the user and the object.

Referring to FIG. 8A, in the present exemplary embodiment, the first information extraction devices 120 may be implemented as two image sensors 820A and 820B, and the second information extraction devices 130 may be implemented as two image sensors 830A and 830B, where the image sensors 820A, 820B, 830A, and 830B may be disposed at four top corners of the scene. The processing device 140 would generate a global image $I_S$ including a user U8 and an object T8 by stitching images captured by the image sensors 820A, 820B, 830A, and 840B and execute the steps in FIG. 8B by using the global image $I_S$.

Referring to FIG. 8A and FIG. 8B, in the present exemplary embodiment, the processing device 140 would perform coordinate transformation (C8) after obtaining the global image $I_S$ (Step S802) to generate a stereo global model (Step S804) represented by, for example, a world coordinate system. Next, similar to the previous exemplary embodiments, after the processing device 140 constructs the stereo global model, it would obtain human eye gaze information (Step S806A) and stereo scene calibration information (Step S806B) and perform viewing analysis on the user U8 with respect to the display 110 (Step S808). The processing device 140 would perform image recognition on the object T8 by using the global image $I_S$ according to the user's gaze (Step S810) so as to obtain a scene content viewed by the user U8. Next, the processing device 140 would compute a presentation of the related information of the object T8 on the display 110 based on the stereo scene calibration information to accordingly display the related information (Step S812). The details of these steps may be referred to the related description in the previous exemplary embodiments and would not be repeated herein for brevity.

Figure 9A:
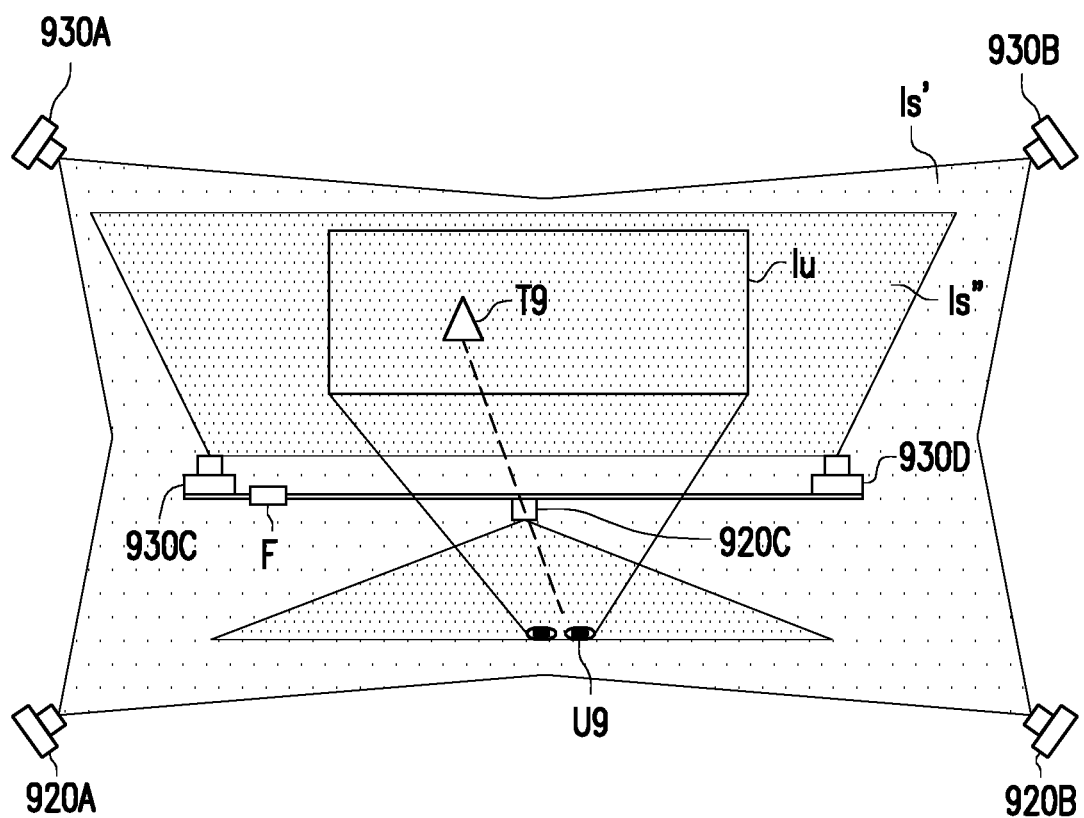
FIG. 9A illustrates a schematic diagram of a configuration of the display system in accordance with an exemplary embodiment of the disclosure.
Figure 9B:
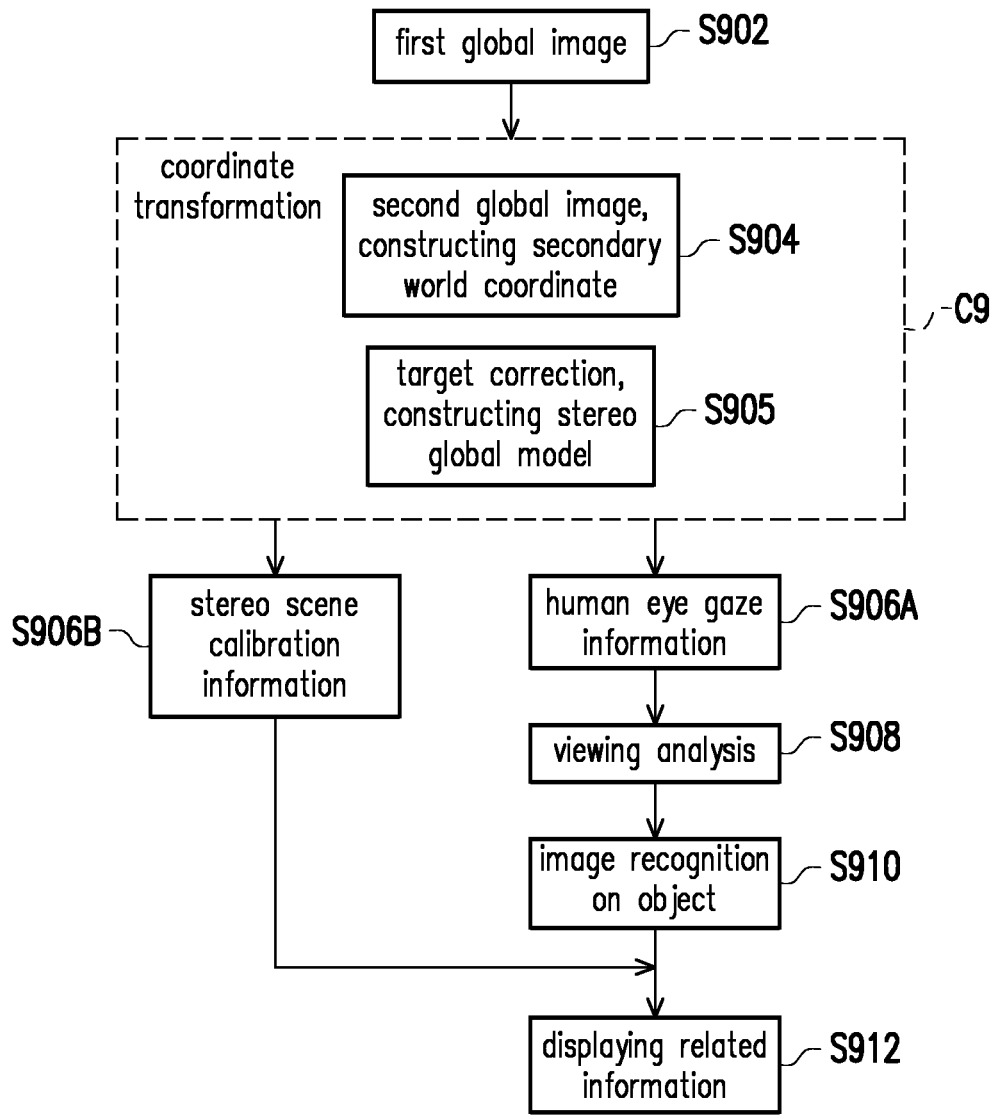
FIG. 9B illustrates a flowchart of a method for information display in accordance with an exemplary embodiment of the disclosure.

FIG. 9A illustrates a schematic diagram of a configuration of the display system in accordance with an exemplary embodiment of the disclosure. FIG. 9B illustrates a flowchart of a method for information display in accordance with an exemplary embodiment of the disclosure. In the present exemplary embodiment, two coordinate systems would be corrected and integrated dynamically by using a feature point F as a target.

Referring to FIG. 9A, in the present exemplary embodiment, the first information extraction devices 120 may be implemented as two IR sensors 920A and 920B as well as one image sensor 920C, and the second information extraction devices 130 may be implemented as two IR sensors 930A and 930B as well as two image sensors 930C and 930D, where the IR sensors 920A, 920B, 930A, and 930B may be disposed at four top corners of the field, and the image sensors 920C, 930C, and 930D may be disposed on the display 110. The display 110 would further include a target F as a feature point, which can be considered as a basis for coordinate transformation. The processing device 140 would generate a global image $I_S'$ (referred to as a first global image hereafter) including a user U9 and an object T9 by stitching IR images captured by the IR sensors 920A, 920B, 930A, and 930B and execute the steps in FIG. 9B by using the global image $I_S'$.

Referring to FIG. 9A and FIG. 9B, in the present exemplary embodiment, the processing device 140 would perform coordinate transformation (C9) after obtaining the global image $I_S'$ (Step S902). The processing device 140 would generate a second global image $I_S''$ having secondary world coordinates according to the object images and the user images (Step S904) and construct a stereo global model by correcting the first global image $I_S'$ and the second global image $I_S''$ having secondary world coordinates by the target F (Step S905). Next, similar to the previous exemplary embodiments, after the processing device 140 constructs the stereo global model, it would obtain human eye gaze information (Step S906A) and stereo scene calibration information (Step S906B) and perform viewing analysis on the user U9 with respect to the display 110 (Step S908). The processing device 140 would perform image recognition on the object T9 by using the global image $I_S$ according to the user's gaze (Step S910) so as to obtain a scene content viewed by the user U9. Next, the processing device 140 would compute a presentation of the related information of the object T9 on the display 110 along with the stereo scene calibration information to accordingly display the related information (Step S912). The details of these steps may be referred to the related description in the previous exemplary embodiments and would not be repeated herein for brevity.

The method and display system for information display proposed in one exemplary embodiment of the disclosure perform coordinate transformation according to position information of the user and the object to generate fused information therebetween and accordingly display the related information of the object on the display. Hence, the related information displayed on the display would match the user's field of view to enhance the user's viewing experience with comfort.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display system, comprising:
    a light-transmissive display;
    at least one first information extraction device comprising an image sensor, configured to capture a user image of a user to generate position information of the user;
    at least one second information extraction device comprising an image sensor, configured to capture an object image of an object to generate position information of the object; and
    a processing device, connected to the display, the at least one first information extraction device and the at least one second data information extraction device, configured to:
        transform the position information of the user and the position information of the object to a same coordinate system;
        generate human eye gaze information and stereo scene calibration information of a scene in which the object is located according to a result of a coordinate transformation comprising the transformed position information of the user and the transformed position information of the object;
        compute a gaze point of the user on the display according to the human eye gaze information, and perform image recognition on the object according to the object image to generate an image recognition result;
        generate fused information between the user and the target according to the human eye gaze information, the image recognition result, and the stereo scene calibration information, wherein the fused information is a displaying position on the display; and
        display related information of the object on the display according to the fused information.

2. The display system according to claim 1, wherein:
    the position information of the user comprises a user coordinate of the user with respect to the at least one first information extraction device, and the position information of the object comprises an object coordinate of the object with respect to the at least one second information extraction device; and
    the processing device transforms the user coordinate and the object coordinate to the same coordinate system.

3. The display system according to claim 1, wherein:
    the related information is plane information;
    the fused information is the displaying position at which the related information is set according to the gaze point, the image recognition result, and the stereo scene calibration information; and
    the processing device displays the related information at the displaying position.

4. The display system according to claim 1, wherein:
    the related information is stereo information;
    the processing device further pre-construct a stereo model of the related information;
    the fused information is the displaying position at which the related information is set according to the stereo model, the gaze point, the image recognition result, and the stereo scene calibration information; and
    the processing device displays the related information stereoscopically at the displaying position.

5. The display system according to claim 1, wherein:
    the user is in a first medium having a first refractive index, and the object is in a second medium having a second refractive index;
    the processing device further calibrates the human eye gaze information according to the first refractive index and the second refractive index to generate calibrated human eye gaze information; and
    the processing device computes the fused information according to the calibrated human eye gaze information and the stereo scene calibration information.

6. The display system according to claim 1, wherein:
the at least one first information extraction device is at least two image sensors, respectively configured to capture user images of the user;
the at least one second information extraction device is at least two image sensors, respectively configured to capture object images of the object;
the at least one first information extraction device and the at least one second information extraction device are disposed on the display;
the processing device transforms image coordinates of the user images to a world coordinate system to generate user world coordinates to accordingly compute human eye gaze information;
the processing device transforms image coordinates of the object images to the world coordinate system to generate object world coordinates to accordingly compute stereo scene calibration information; and
the processing device computes the fused information according to the human eye gaze information and the stereo scene calibration information.

7. The display system according to claim 1, wherein:
the at least one first information extraction device further comprises a positioning device and a receiver, wherein the receiver is disposed on the display, wherein the positioning device is a handheld device or a wearable device of the user, and wherein the receiver receives the result of the coordinate transformation from the positioning device, wherein the result of the coordinate transformation comprises user world coordinates of the user in a world coordinate system;
the at least one second information extraction device is at least two image sensors, respectively configured to capture object images of the object;
the processing device calculates the human eye gaze information according to the user world coordinates;
the processing device transforms image coordinates of the object images to the world coordinate system to generate object world coordinates to accordingly compute the stereo scene calibration information; and
the processing device computes the fused information according to the human eye gaze information and the stereo scene calibration information.

8. The display system according to claim 1, wherein:
the at least one first information extraction device further comprises touch sensing elements disposed on the display, configured to detect a touch operation performed on the display by the user;
the at least one second information extraction device are at least two image sensors, respectively configured to capture object images of the object;
the processing device obtains user world coordinates of the user in a world coordinate system according to a position of the touch operation to accordingly compute the human eye gaze information;
the processing device transforms image coordinates of the object images to the world coordinate system to generate object world coordinates to accordingly compute the stereo scene calibration information; and
the processing device computes the fused information according to the human eye gaze information and the stereo scene calibration information.

9. The display system according to claim 1, wherein:
the processing device pre-stores spatial coordinates of a scene in which the object is located as the stereo scene calibration information;
the at least one first information extraction device is at least two image sensors, respectively configured to capture user images of the user;
the at least one second information extraction device is at least one image sensor, respectively configured to capture an object image of the object;
the processing device computes a gaze vector according to the gaze point of the user in the user images; and
the processing device performs viewing angle transformation according to the gaze vector and the spatial coordinates of the scene to accordingly generate the fused information.

10. The display system according to claim 9, wherein:
the processing device performs calibration on the gaze vector according to an offset of a human eye position in each of the user images with respect to an image center to generate a calibrated gaze vector and generates the fused information according to the calibrated gaze vector and the spatial coordinates of the scene.

11. The display system according to claim 9, wherein:
the at least one first information extraction device and the at least one second information extraction device are a plurality of image sensors, configured to capture a plurality of images to form a global image, wherein the global image comprises an image of the object and an image of the user;
the processing device stores a transformation model trained by a machine learning algorithm;
the processing device inputs a human eye position and a gaze vector of each of the user images into the transformation model to generate the viewing angle transformation of the user and generate the fused information according to the viewing angle transformation of the user and the spatial coordinates of the scene.

12. The display system according to claim 11, wherein:
the processing device further computes a plurality of training human eye positions of the user as well as a plurality of training gaze points on the display and labels a plurality of training human eye gaze ranges to train the transformation model by the machine learning algorithm.

13. The display system according to claim 1, wherein:
the at least one first information extraction device and the at least one second information extraction device are a plurality of image sensors, configured to capture a plurality of images to form a global image, wherein the global image comprises an image of the object and an image of the user;
the processing device performs coordinate transformation according to the global image to construct a stereo global model with a world coordinate system; and
the processing device computes the human eye gaze information and the stereo scene calibration information according to the stereo global model and calculates the fused information according to the human eye gaze information and the stereo scene calibration information.

14. The display system according to claim 1, wherein:
the at least one first information extraction device and the at least one second information extraction device comprise a plurality of infrared sensors placed on top of a field area and a closed area comprising at least the light-transmissive display, the user, and the object to generate a first global image;
the at least one first information extraction device and the at least one second information extraction device further comprise a plurality of image sensors disposed on the display, configured to generate a user image and an object image;

the display further comprises a target;

the processing device generates a second global image according to the user image and the object image;

the processing device constructs a stereo global model having a world coordinate system according to the target, the first global image, and the second global image;

the processing device computes the human eye gaze information and the stereo scene calibration information according to the stereo global model and thereby computes the fused information.

15. A method for information display, applicable to a display system having a light-transmissive display, at least one first information extraction device comprising an image sensor, and at least one second information extraction device comprising an image sensor, wherein the method comprises:

capturing a user image of a user to generate position information of the user by using the at least one first information extraction device;

capturing an object image of an object to generate position information of the object by using the at least one second information extraction device;

transforming the position information of the user and the position information of the object to a same coordinate system;

generating human eye gaze information and stereo scene calibration information of a scene in which the object is located according to a result of a coordinate transformation comprising the transformed position information of the user and the transformed position information of the object;

compute a gaze point of the user on the display according to the human eye gaze information, and perform image recognition on the object according to the object image to generate an image recognition result;

generating fused information between the user and the target according to the human eye gaze information, the image recognition result, and the stereo scene calibration information, wherein the fused information is a displaying position of the display; and displaying related information of the object on the display according to the fused information.

16. The method according to claim 15, wherein the position information of the user comprises a user coordinate of the user with respect to the at least one first information extraction device, wherein the position information of the object comprises a object coordinate of the object with respect to the at least one second information extraction device, and wherein the step of performing coordinate transformation on the position information of the user and the position information of the object comprises:

transforming the user coordinate and the object coordinate to the same coordinate system.

17. A display system, connected to at least one first information extraction device comprising an image sensor and at least one second information extraction device comprising an image sensor, comprising:

a light-transmissive display;

a processing device, configured to:

obtain position information of a user according to a user image of the user captured by the at least one first information extraction device;

obtain position information of an object according to an object image of the user captured by the at least one second information extraction device;

transform the position information of the user and the position information of the object to a same coordinate system;

generate human eye gaze information and stereo scene calibration information of a scene in which the object is located according to a result of a coordinate transformation comprising the transformed position information of the user and the transformed position information of the object;

compute a gaze point of the user on the display according to the human eye gaze information, and perform image recognition on the object according to the object image to generate an image recognition result;

generate fused information between the user and the target according to the human eye gaze information, the image recognition result, and the stereo scene calibration information, wherein the fused information is a displaying position on the display; and display related information of the object on the display according to the fused information.

18. The display system according to claim 17, wherein the position information of the user comprises a user coordinate of the user with respect to the at least one first information extraction device, wherein the position information of the object comprises a object coordinate of the object with respect to the at least one second information extraction device, and wherein the processing device transforms the user coordinate and the object coordinate to the same coordinate system.

* * * * *